May 30, 1939. G. SLAYTER ET AL 2,160,003
AIR FILTER
Original Filed Sept. 14, 1931   2 Sheets-Sheet 1
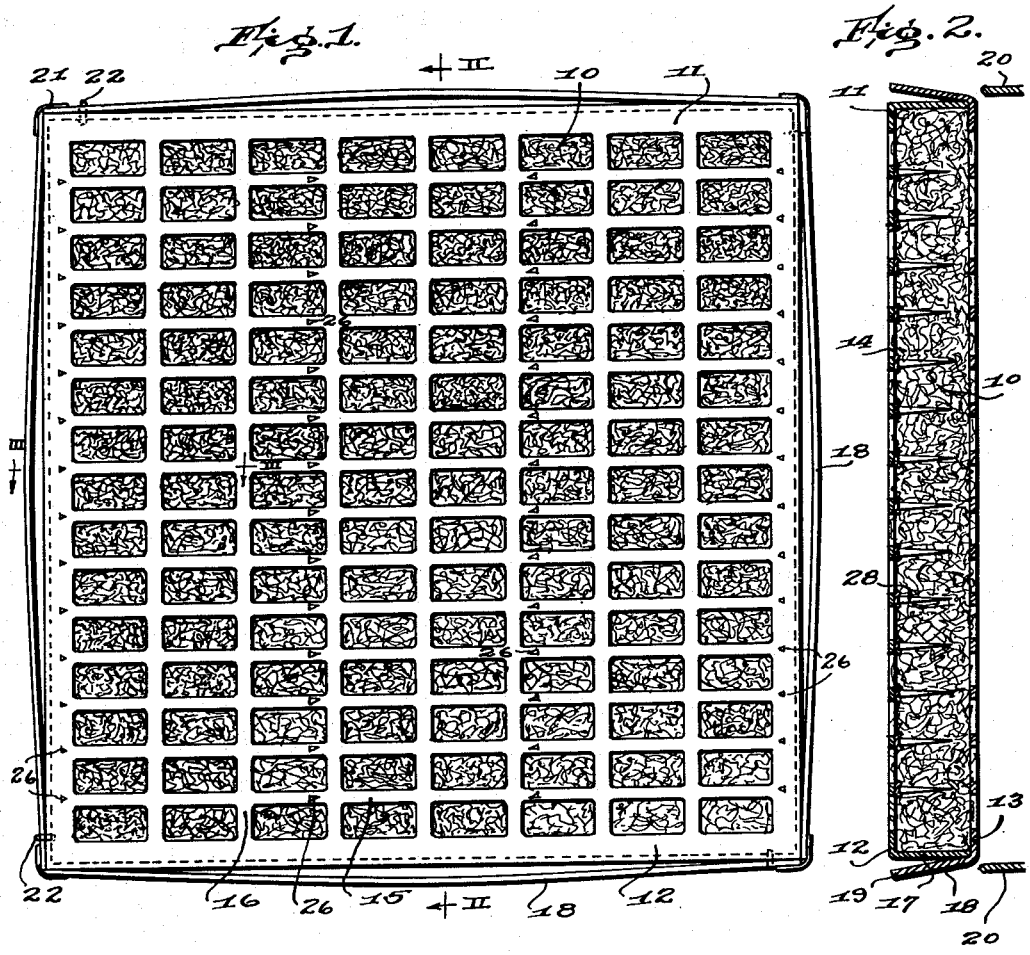
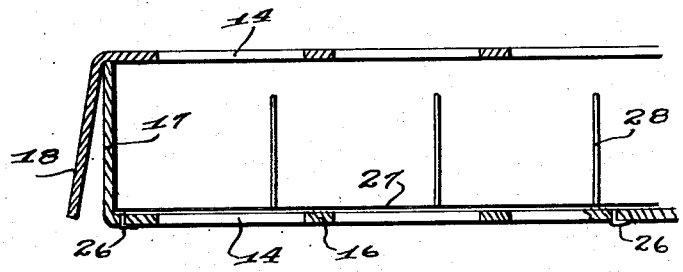
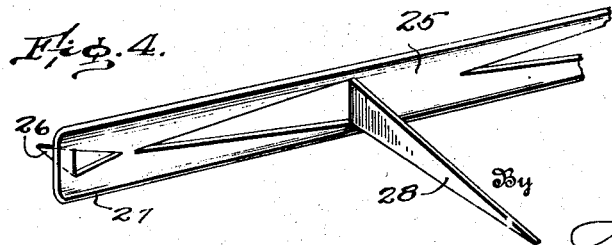

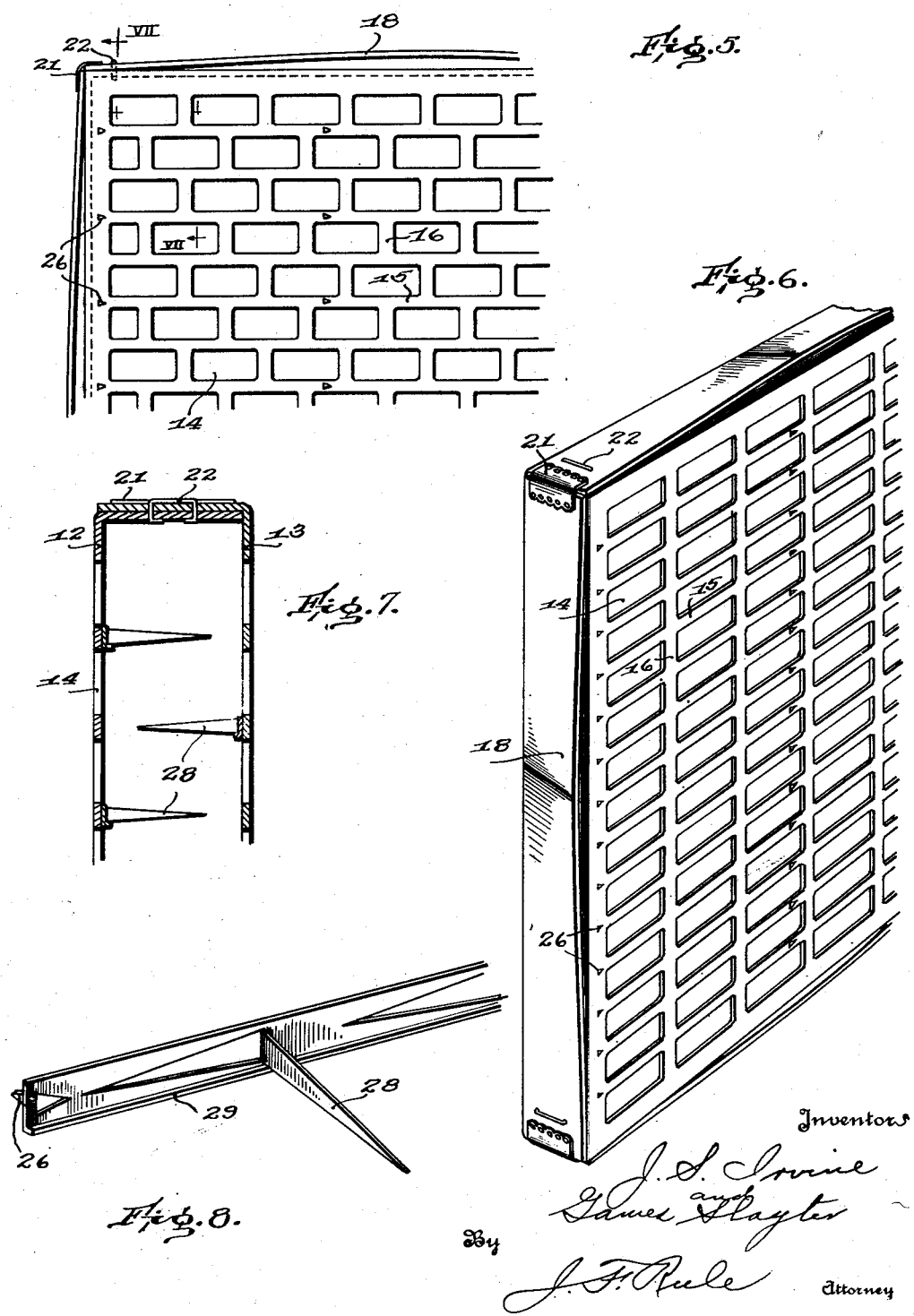

Patented May 30, 1939

2,160,003

UNITED STATES PATENT OFFICE 2,160,003

AIR FILTER

Games Slayter, Newark, and Jan Stuart Irvine, Toledo, Ohio, assignors, by mesne assignments, to Owens-Corning Fiberglas Corporation, a corporation of Delaware Application September 14, 1931, Serial No. 562,752
Renewed August 23, 1938

10 Claims. (Cl. 183—49)

Our invention relates to filters designed for filtering air and other gases, and in its preferred form embodies filters of the semi-dry or viscous type in which the filtering medium is treated with oil or an oily substance having an affinity for dust and other foreign substances to be removed from the air or gas which is being filtered.

At the present time filters of this type which are in commercial use ordinarily comprise a filtering medium made of some kind of metal treated with oil and enclosed in a metal container. These filters are too expensive to be thrown away when they become clogged with dirt, so that they must be renovated by a cleaning process. This requires additional equipment and involves labor and expense, and is objectionable for various other reasons.

An object of the present invention is to provide a practical filter which can be made very cheaply so that when its efficiency is impaired by the accumulation of dust and dirt it can be discarded and replaced by a new filter at little expense.

Other objects of the invention will appear hereinafter.

In the accompanying drawings:

Fig. 1 is a front elevation of a filter constructed in accordance with the principles of our invention.

Fig. 2 is a sectional elevation at the line II—II on Fig. 1.

Fig. 3 is a sectional detail of the cover or container, the section being taken at the line III—III on Fig. 1, with the filtering medium omitted.

Fig. 4 is a fragmentary detail view of a metal reenforcing strip.

Fig. 5 is a fragmentary elevation view showing a modified form of the cover.

Fig. 6 is a perspective view, partly broken away, of the cover or container shown in Fig. 1.

Fig. 7 is a section at the line VII—VII on Fig. 5 and shows a modified form of the metal reenforcing strips.

Fig. 8 is a fragmentary view of the form of reenforcing strip shown in Fig. 7.

Referring particularly to Figs. 1 and 2, the filter comprises a pad or filler 10 of filtering material, and a cover or container 11. The filtering material 10 is preferably made of fibrous glass, commonly known as glass wool. This material is made by subjecting a stream of molten glass to the action of air or steam under considerable pressure, thereby reducing the glass to threads or filaments which accumulate in a loose mass. This glass while still at a high temperature is treated with a heavy oil which adheres to the glass. This treatment serves to temper the glass and give it a semi-dry coating of viscous oil. Preferably, a heavy oil is used having a low cold test, which oil has been refined to remove all odor and which contains about 10% to 25% wax. The composition of such an oil and one method of treating the glass fibers therewith are fully set forth in Patent No. 2,068,202, January 19, 1937, to Donald C. Simpson. It is found that glass wool treated in this manner provides a filter which is efficient through a wide range of temperatures, without any running or dripping of the oil. The oil will not run off at a temperature of 125° F. and is sufficiently sticky or viscous to operate effectively as a dust catcher at temperatures of 20° F. or more below zero.

The pad 10 of filtering material may be made sufficiently compact to retain its shape without external support, so that it can be used without the cover 11. The use of a cover, however, has substantial advantages.

The cover or container 11 is preferably made in whole or in part of heavy paper, cardboard or fiber board. If desired, it may be treated with some suitable oil-proofing material such as varnish, shellac or silicate of soda to make it impervious to the action of the oil comprised in the filtering medium. It is found in practice, however, that when the filter is treated with an oil of the character above indicated, which does not run, it has comparatively little effect on the paper cover, so that an oil-proofing treatment is ordinarily unnecessary.

The container 11 comprises two sections, namely, an inner section 12 and an outer section 13, which are substantially similar in construction except that the inner section 12 is of slightly smaller dimensions so as to telescope within the section 13. The front and rear faces of the container consist of open-work comprising a multiplicity of openings 14 to permit the free passage of air through the filter. The structure comprises parallel ribs or strips 15 extending horizontally across the filter and vertical parallel intersecting strips 16, thus providing substantially rectangular openings 14. The cover sections 12 and 13 are provided, respectively, with flanges 17 and 18 extending substantially at right angles to the body of said sections. The flanges 18 forming the outer edge portion of the filter are outwardly bulged or curved, as indicated in the drawings. In other words, the free edges 19 of the flanges 18 are bowed outwardly and spaced from the flanges 17, except at the corners of the container. The material of which the container is made has a certain amount of resiliency, so that when the filter is slipped into position in a frame 20 (Fig. 2) the resilient sides 18 are pressed inward towards the end flanges 17 and are held with a yielding pressure extending substantially throughout their length, against the retaining walls of the frame 20, thus avoiding leakage of air between the filter and said frame. This construction provides a simple and practical means for obtaining a substantially air tight connection between the filter and the frame 20 in which the filter is placed when in use.

The end strips 18 may be secured together at the corners of the container by metal corner pieces 21. In assembling the parts, the filter pad is inserted within the inner cover piece 12. The outer cover section 13 is then placed over the section 12 and secured thereto as by means of small brads or staples 22, thus holding the parts in assembled relation. If desired, the ends of the staples may be bent inward, as shown in Fig. 7, to clamp the parts in position.

Metal reenforcing strips 25 are attached to the inner faces of either one or both of the cover sections 12 and 13. These strips, as shown, extend transversely of the filter from one edge thereof to the other. Said strips are formed with tangs 26 at their ends and also at intermediate points by which the strips are secured in position. The longitudinal edges 27 of the strips are preferably bent or curved upwardly to stiffen said strips, so that they serve to stiffen the front and rear walls of the container, thus providing a substantially rigid structure.

Prongs 28 provided at intervals along the reenforcing strips are preferably formed by stamping them out of sheet metal comprising said strips and bending them upwardly at right angles. These prongs project into the filter pad and serve to quilt or hold the filtering material in position, preventing sagging or matting of said material. As shown in Figs. 1 and 2, all of the reenforcing strips 25 with their prongs 28 are attached to the inner cover section 12, a reenforcing strip being provided for and attached to each of the transverse ribs 15. Obviously the number of strips used might be reduced and the arrangement otherwise modified. A modification is shown, for example, in Fig. 7, in which the reenforcing strips are placed alternately on the inner and outer sections 12 and 13, so that both said sections are reenforced. This arrangement also provides prongs 28 extending alternately from opposite cover sections. Said prongs may be made of a length to extend partly or entirely through the filtering pad. The reenforcing strips shown in Figs. 7 and 8 are also of somewhat modified construction comprising a flat body portion and an edge flange 29 projecting at right angles thereto.

Fig. 5 illustrates a modified arrangement of the openings 14, the openings in each horizontal row being in staggered relation to those of the adjoining rows. This provides a somewhat stronger construction. Also, it permits the openings 14 in one cover section to be offset with respect to those of the opposite cover section so that the air passing through the filter, instead of going in a straight line, is deflected laterally to a certain extent. In this manner air currents are broken up and the air is caused to move in a devious path through the filter, whereby the effectiveness of the latter is increased.

Modifications other than those herein disclosed may be resorted to within the spirit and scope of our invention.

What we claim is:

1. A container for an air filtering material, said container made of fibrous material and comprising front and rear telescoping sections, each section including a substantially flat rectangular body portion, edge portions extending at right angles thereto, each said body portion consisting of open-work providing openings for the passage of air therethrough and through the filter, and metal reenforcing strips attached to the inner face of one of said sections and extending transversely of said section from one edge to the other thereof.

2. A container for an air filtering material, said container made of fibrous material and comprising front and rear telescoping sections, each section including a substantially flat rectangular body portion, edge portions extending at right angles thereto, each said body portion consisting of open-work providing openings for the passage of air therethrough and through the filter, and angular sheet metal reenforcing strips secured to the inner face of one of said sections and extending transversely thereof.

3. A container for an air filtering material, said container made of fibrous material and comprising front and rear telescoping sections, each section including a substantially flat rectangular body portion, edge portions extending at right angles thereto, each said body portion consisting of open-work providing openings for the passage of air therethrough and through the filter, and angular sheet metal reenforcing strips secured to the inner face of one of said sections and extending transversely thereof, said strips being formed with integral prongs projecting perpendicularly therefrom.

4. A filter comprising a flat rectangular pad of fibrous filtering material, a container for said pad comprising front and rear telescoping sections, at least one of said sections being made of fibrous material, the body portions of said sections having open formation providing a multiplicity of openings for the passage of air through the filter, and metal reenforcing strips extending transversely of the filter and attached to the inner face of said section of fibrous material, said strips being formed at short intervals with integral prongs extending outwardly therefrom and projecting into the filtering material.

5. A filter comprising a flat rectangular pad of fibrous filtering material, a container for said pad comprising front and rear telescoping sections, at least one of said sections being made of fibrous material, the body portions of said sections having open formation providing a multiplicity of openings for the passage of air through the filter, and sheet metal reenforcing strips attached to the inner face of said section of fibrous material and extending transversely of said section in parallel relation, said strips being angular in cross-section and formed with integral prongs projecting therefrom into the filtering material.

6. A filter comprising an elastic pad of fibrous filtering material and a paper container therefor, said container comprising front and rear telescoping sections, each section consisting of a flat rectangular body and integral edge flanges of resilient paper material, the flanges of one section overlying those of the other, said overlying flange portions being bowed outwardly and adapted, when the filter is inserted in a frame, to be sprung inwardly by the walls of said frame and provide a substantially air tight seal between said frame and the walls of the filter.

7. A filter comprising a rectangular flat body of fibrous filtering material, metal reenforcing strips extending transversely of said body, and prongs projecting from said strips into said body.

8. A filter comprising a rectangular flat body of fibrous filtering material, metal reenforcing strips angular in cross-section extending transversely of the filter in parallel relation at uniformly spaced intervals, and prongs formed integrally with said strips and projecting perpendicularly therefrom into the filtering material at spaced intervals along the strips.

9. A filter unit comprising, in combination, a filtering medium, a container therefor including a rectangular body and flange portions of resilient material forming the edges of the container, said flange portions being bowed outwardly and yieldingly movable inwardly by pressure applied along their outer surfaces whereby the filter unit may be inserted in a supporting frame having an opening of a size and shape to receive and fit said unit with said flange portions pressed inwardly and resiliently held in sealing contact with the walls of said opening.

10. A filter unit comprising a filtering medium, a container therefor including a body and flange portions of resilient material forming the edges of said container, said unit being adapted to occupy an opening defined by frame members and to have its flange portions forced inwardly toward the body of the filter and thereby hold the filter in position and provide a substantially air tight seal when said unit is inserted in the opening defined by the frame members.

GAMES SLAYTER.
JAN STUART IRVINE.